(12) United States Patent
Bohle et al.

(10) Patent No.: US 6,925,241 B2
(45) Date of Patent: Aug. 2, 2005

(54) DRAWER FOR THE MANAGEMENT OF OPTICAL FIBERS

(75) Inventors: Klaus Werner Bohle, Bottrop (DE); Peter Hoeschler, Velbert (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/682,343

(22) Filed: Oct. 9, 2003

(65) Prior Publication Data

US 2004/0120681 A1 Jun. 24, 2004

Related U.S. Application Data (60) Provisional application No. 60/417,818, filed on Oct. 11, 2002.

(51) Int. Cl.[7] .................................................. G02B 6/00
(52) U.S. Cl. ...................................... 385/135; 385/134
(58) Field of Search ................................ 385/134, 135, 385/136

(56) References Cited

U.S. PATENT DOCUMENTS

| | | | |
|---|---|---|---|
| 4,824,196 A | | 4/1989 | Bylander |
| 4,900,123 A | * | 2/1990 | Barlow et al. ................. 385/53 |
| 5,119,459 A | | 6/1992 | Meyerhoefer et al. |
| 5,421,532 A | | 6/1995 | Richter |
| 5,506,927 A | | 4/1996 | Kitajima et al. |
| 5,631,993 A | | 5/1997 | Cloud et al. |
| 5,717,811 A | | 2/1998 | Macken |
| 5,887,106 A | * | 3/1999 | Cheeseman et al. ........ 385/135 |
| 6,097,872 A | | 8/2000 | Kusuda et al. |
| 6,282,360 B1 | | 8/2001 | Milanowski et al. |
| 6,360,050 B1 | | 3/2002 | Moua et al. |
| 6,707,978 B2 | * | 3/2004 | Wakileh et al. .............. 385/134 |
| 6,741,785 B2 | * | 5/2004 | Barthel et al. ............... 385/135 |
| 2004/0120680 A1 | | 6/2004 | Dillat |

FOREIGN PATENT DOCUMENTS

| | | |
|---|---|---|
| EP | 0 466 668 A2 | 1/1992 |
| EP | 0 689 074 A1 | 12/1995 |
| FR | 2 678 076 A1 | 12/1992 |
| GB | 2 254 194 A | 9/1992 |
| JP | 2002-236219 | 8/2002 |
| WO | WO 94/23324 | 10/1994 |
| WO | WO 95/07481 | 3/1995 |
| WO | WO 95/07486 | 3/1995 |
| WO | WO 95/09375 | 4/1995 |
| WO | WO 02/19005 A2 | 3/2002 |

* cited by examiner

*Primary Examiner*—Thanh-Tam Le
(74) *Attorney, Agent, or Firm*—James J. Trussell (57) ABSTRACT

A system for management of optical fibers. The system has a housing including a back side and a front side. There are a plurality of drawers mounted in the housing. The drawers have a front and a back and are mounted so as to be moveable between a first position and a second position. The drawers are in the first position, the housing substantially blocks access to the back of the drawers. When the drawers are in the second position, there is access to the back of the drawers. The system also includes an array of fiber optic connectors mounted on a respective one of each of the drawers and an array of fiber optic splicing cassettes mounted on a respective one of each of the drawers.

13 Claims, 9 Drawing Sheets

DRAWER FOR THE MANAGEMENT OF OPTICAL FIBERS

CROSS-REFERENCE TO RELATED APPLICATION

This application claims priority to U.S. Provisional Patent Application No. 60/417,818, filed Oct. 11, 2002.

TECHNICAL FIELD

The invention relates to a system that allows the management or organization of optical fibers to be used in an optical fiber telecommunication network. It relates more particularly to a system of drawers allowing the management of optical fibers including arrays of cassettes that may contain fiber splices.

BACKGROUND OF THE INVENTION

The use of optical fibers has become more and more dominant in the telecommunication field. This results in a growing number of optical fibers that must be handled—such as spliced, connected, and distributed—and therefore systems for the management or organization of optical fibers are used to a growing extent. It is desirable to have an optimum organization of the fibers, and thus the ability to make modifications and changes in a controlled manner. These changes should preferably be carried out so that if at all possible only those optical fibers that have to be changed and modified are moved, while all other optical fibers essentially remain untouched so that undesired disturbances are avoided.

These arrays of cassettes have to be in some way mounted onto a modular optical distribution frame or rack, such as a 48.3 cm (19 inch) rack. For this purpose they are often built into housings that are provided with some kind of an opening mechanism such as a door. In some cases the housings are arranged so that they can be rotated and then opened. This is particularly the case for the commonly used arrays of cassettes which are placed on rails or racks so that they can be flipped like pages of a book, as described in WO 95/07481 and WO 94/23324. In all these cases it is necessary to open some kind of a door in order to access a single cassette. In case of placing the array of cassettes into housings some kind of a door needs to be opened in order to access a single cassette. In other cases the array of cassettes may stand by themselves or are placed onto a rack or inserted into a splice. This is also the case for arrangements as described in WO 95/09375, WO 95/07486 and FR 2 789 497. It would thus be desirable to provide a cassette array, and an individual cassette, that provide a configuration, which as far as possible would permit access to an individual cassette without disturbing the remaining cassettes and fibers in the configuration.

SUMMARY OF THE INVENTION

The invention suggests a system of drawers arranged in a housing into which the incoming fibers are introduced the housing having a back side and a front side, the incoming fibers to be introduced at the backside, the front side comprising for each individual drawer an array of connectors and an array of fiber optic splicing cassettes which can be accessed from the front side without opening the drawer. Preferably the connectors are provided with a length of optical fibers, which can be entered into the individual splicing cassettes where they could be spliced together with the incoming fibers. More preferably guiding means are introduced in the drawer allowing a guidance of the optical fibers. This is possible both for the incoming fibers as well as the fibers being connected to the fiber optic connectors.

The drawers are designed so that they can be individually moved out of the housing in order to allow a direct access to the optical fibers to be handled.

In a first embodiment of the invention the drawers are moved on rails or other telescopic devices resulting in a parallel movement of the front side.

In a second embodiment the individual drawers can be rotated around an axis. This axis is preferably arranged at one front end of the drawer and it should be so designed that the drawer is accessible for the handling of the optical fibers. Preferably the angle of rotation is below 90° to minimize the movement of the optical fibers.

The array of splicing cassettes is arranged so that every individual splicing cassette can be moved out of the system without the opening of the drawer. Preferably the area for the rotation axis of the splicing cassettes is near the front side of the drawer. More preferably the rotation angle for the individual splicing cassette is less than 90°, or more preferably less than below 60°.

In a first embodiment the splicing cassettes can be rotated around a fixed axis common to all splicing cassettes of the array within the drawer.

In a second embodiment the splicing cassettes are rotated so that they simultaneously are also linearly moved out of the drawer.

The advantage of this configuration including drawers in a housing with an array of fiber optic connectors and an array of splicing cassettes which can be opened without opening the drawer lies in the fact that the system minimizes the movement of the optical fibers. Especially it is possible to only open an individual splicing cassette in a given drawer without disturbing the other components in the drawer and the adjacent splicing cassettes.

A third embodiment comprises a drawer system with an array of cassettes having a width and a longitudinal extension larger than the width and a thickness significantly smaller than the width. The cassettes are arranged between two side plates which are connected with each other with at least two fixing means that are spaced apart by a given distance whereby the cassettes are provided with at least two curved slots the first one being arranged towards a first longitudinal end of the cassettes and the second one being arranged further inside the cassette and being longer than the first slot. The cassettes are mounted between the two side plates so that the two fixing means pass through the slots. These slots are essentially curved and so designed that an individual cassette can be moved out of the array whereby it is rotated at the first longitudinal end and simultaneously lifted out of the stack in a direction which is perpendicular to the longitudinal direction of the cassette.

A fourth embodiment comprises a drawer system with an array of cassettes having cassettes which can be moved on rails or other telescopic devices resulting in parallel movement to the front side to get access to each individual cassette without moving the others.

In a preferred configuration the cassette is so designed that the incoming and outgoing fibers pass into the cassette close to the ends of the curved slots and at the first longitudinal end of the cassette.

The individual drawers can preferably be provided with guides both for the incoming fibers as well as for the fibers being connected to the fiber optic connectors so that it is possible to guide them more or less directly into a given individual cassette of the array of fiber optic splicing cassettes. This might be achieved by guides for example in the form of tubes or deflectors so that it is possible to access any cassette from the backside of each drawer. In one configuration this would require to have as many separate guides as cassettes are placed in the drawer. This could be solved in a similar manner for the fibers that are attached to the connectors. In this case it might be sufficient to define within the configuration of the connectors which of them is guided into which individual cassette.

This then leads to the following possibilities for the installation and modification of the arrangement of the optical fibers: for an initial arrangement the drawer would be opened and the entire installation would be made by inserting the incoming fibers so that they pass into the cassettes and likewise to install the fibers that are leading to the connectors. The corresponding pairs of fibers can then subsequently be spliced within a given cassette.

In an alternative more preferred configuration a smaller number of guides is used where the fibers are guided to a fan-out element which is adjacent to the array of cassettes and where it is possible to allow the fibers to exit the drawer so that they can be manually fed into one of the cassettes.

With the above described configuration with as many guides as cassettes it is particularly advantageous to achieve modifications. For an exchange or insertion of an incoming fiber it is then possible to introduce the fiber into a given guide, which leads to a defined cassette. This cassette would then be opened so that through the guides it is possible to pass the incoming fiber directly into the pre-selected cassette. The same approach can be taken for the fibers on the connector side also these are inserted so that the fibers reach a defined cassette. Subsequently then the splicing can be achieved. This would be possible for the introduction of new fibers as well as for the replacement of fibers in case that some kind of a repair is necessary.

With the alternative more preferred configuration with fewer guides a fan-out element the incoming fibers are inserted as well until they exit the drawer at the external side of the fan-out element. Subsequently the pre-selected cassette is opened and the fibers are fed into in manually. This configuration operates with a smaller number of guides, which is particularly advantageous when dealing with a higher number of cassettes, e.g. 12.

One advantage is that in these particular cases it is possible to introduce optical fibers into the drawer without opening this drawer and by only opening the involved cassette. By this approach it is ensured that the disturbance of all the other fibers is brought to a minimum.

The system comprising the stack of cassettes is preferably produced through conventional molding processes. In a preferred embodiment the first longitudinal end of the cassettes is provided with two pairs of curved slots, two first ones and two longer second ones which are symmetrically arranged with respect to the longitudinal extension of the cassette. In a typical application an array of cassettes is arranged so that they are placed in a manner that when opening the cassette the fibers can be accessed from the top. It is therefore desirable to have arrangements, which are rotated around axes, which are arranged on the right side or left side of the array when standing in front of it. The configuration with two pairs of axes allows to create arrays of cassettes arranged between the two side plates so that the axis configuration is either on the left side or the right side when arranging the stack so that in the practical use the cassettes are accessed from the top.

In such an arrangement of two pairs of curved slots it is usually necessary to arrange them so that at least two of them cross each other. In order to avoid an undesired movement or blocking of the cassette preferably a blocking means is placed into the one of the second slots, which in the specific configuration is not used. In a more preferred configuration this blocking means is simultaneously molded with the cassette so that it can be easily broken off from it being arranged at a place, which is uncritical for the use of the cassette. In one configuration this blocking means can be broken off so that two small pins are left over at the longitudinal end of the cassette being arranged so that they face each other so that they can be used in order to arrange a cassette in the conventional orientation where individual cassettes are moved over each other like pages in a book. This is of course not a preferred configuration but the advantage is that the cassettes could also be utilized in a conventional side by side arrangement where the cassettes are moved with respect to each other.

In one broad aspect of the invention, a device is provided for managing optical fibers, in which the device includes a drawer that carries a plurality of optical fiber cassettes, wherein the drawer can be extended from a frame to provide access to all of the cassettes. In another aspect, a drawer is provided that comprises a plurality of fiber cassettes, wherein the system is so designed that it is possible to open an individual cassette without opening the drawer and without opening the other cassettes. Further modifications include providing guides such as fiber optic tubes.

Other aspects of the invention are described below.

BRIEF DESCRIPTION OF THE DRAWINGS

The present invention will be described with reference to the attached Figures in which.

DETAILED DESCRIPTION OF THE INVENTION

Figure 1:
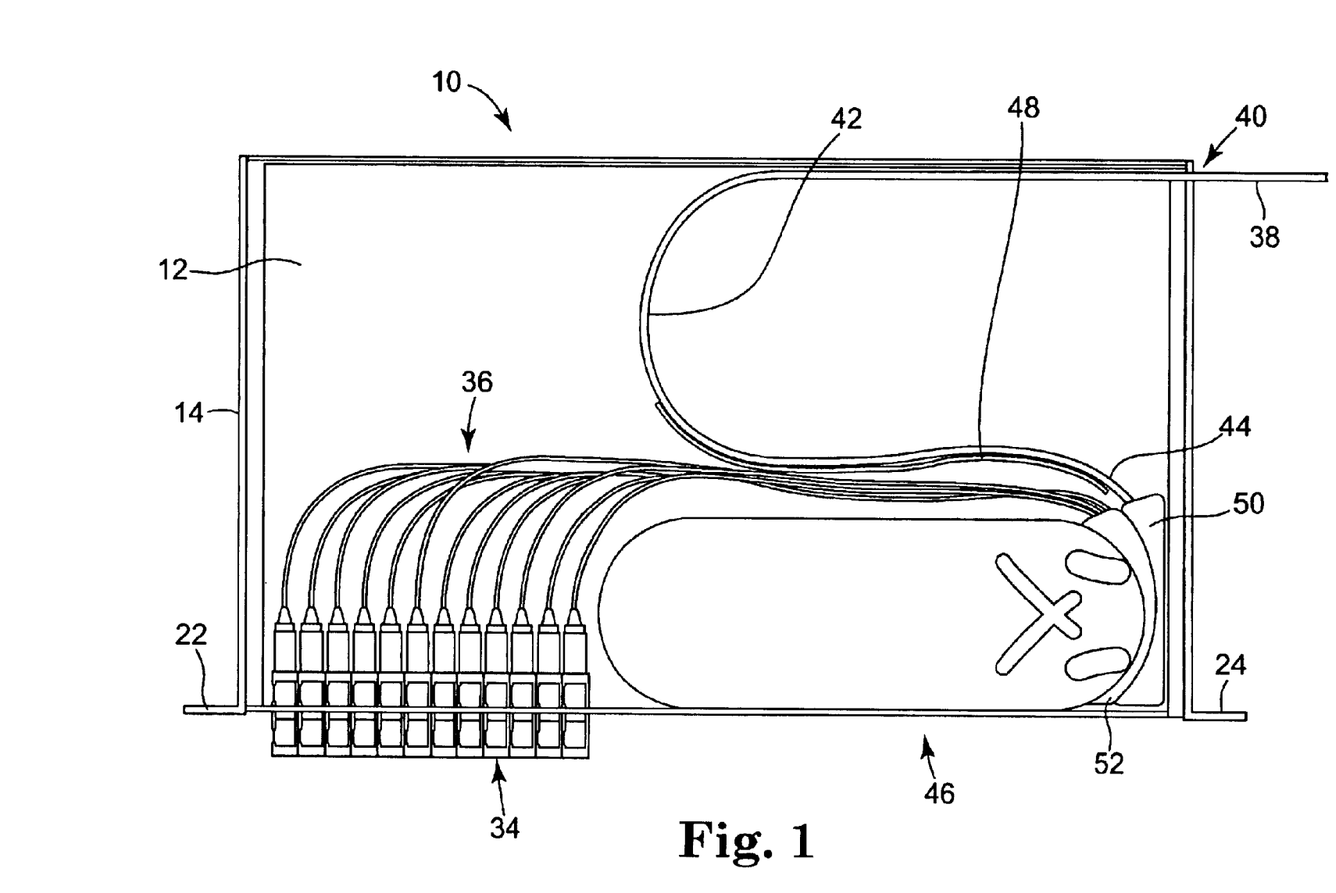
FIG. 1 shows a top view of a drawer in accordance with the invention.
Figure 2:
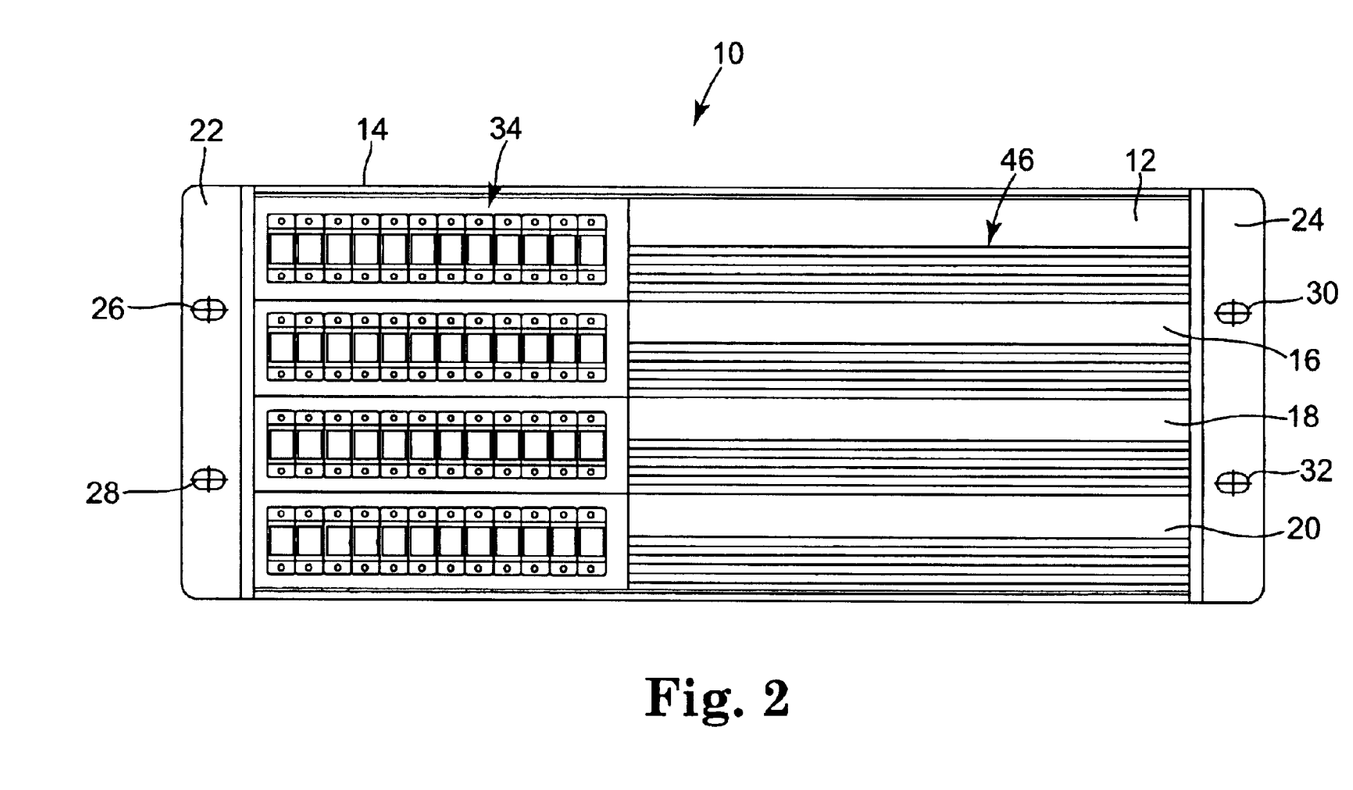
FIG. 2 shows the front view of the housing with arrays of fiber optic connectors and arrays of fiber optic splicing cassettes.

A system 10 of drawers for the management of optical fibers can be seen in FIGS. 1 and 2. FIG. 1 provides a top view of an individual drawer 12 arranged in a housing 14. FIG. 2 provides a front view of the same configuration, which shows a total of four drawers 12, 16, 18, 20, which are arranged one on top of the other. In this particular embodiment the housing is provided with lateral flanges 22, 24 that have holes 26, 28, 30, 32, so that the entire housing 14 can be mounted on to a 48.63 mm (19 inch) rack. This is only to be understood as one possible embodiment. The same type of housing with any given number of drawers can also be designed, so that it can be assembled onto a modular optical distribution frame (MODF).

FIG. 1 shows one arrangement within a drawer. On the left side an array 34 of fiber optic connectors can be seen. Each connector is connected to an optical fiber in the fiber arrangement 36. An incoming optical fiber tube 38 enters the housing 14 on the rear side 40. It should be understood that there can be one or more optical fiber tubes 38 and only one is depicted, which typically is a tube that contains several (often from 4 to 12) optical fibers. Inside the drawer the incoming optical fiber tube is bent typically in two different directions 42, 44, so that it reaches the array of fiber optic splicing cassettes 46. Typically, the bending is obtained through an appropriate guide, housing or tube, one of which is shown in FIG. 1 at 48. The incoming fiber tube then enters another first fan out element 50 that is typically part of the array of fiber optic splicing cassettes 46. The fibers of the incoming fiber tube 38 are distributed inside the fan out element into pairs of fibers and then enters each of the cassettes in the array 46, which is not further shown in detail but commonly known. In the same way the individual fibers coming from the array of fiber optic connectors 34 are guided by a second guide 52, so that they also reach the corresponding fiber optic splicing cassettes. In this cassette the splicing is achieved, which is well-known to someone skilled in the art and is described in, for example, WO 95/07481. There is a preferably a well-defined distribution of fibers within the fan-out element so that each individual fiber tube 38 leads to a predetermined cassette, allowing a fiber to pass from the back side directly into the cassette.

The drawer of the present invention can be moved out of the housing in some manner, provided with an array of fiber optic connectors and an array of splicing cassettes, which can be accessed without opening the drawer. This will be referred to in further details in the following Figures. The fiber tubes 38 are designed so that it is possible to directly guide a fiber from the backside of the drawer on the rear side 40 so that it can be guided into a given cassette. Therefore the number of the optical fiber tubes, 38 corresponds to the number of the cassettes. The particular advantage resulting from this is that it is possible to insert an additional incoming fiber or set of additional in-coming fibers by inserting them at a given drawer into that optical fiber tube 38 that corresponds to the cassette into which the fiber should be guided. In this case it is sufficient to open the corresponding cassette only leaving the drawer closed. The fiber is inserted into fiber optic tube 38 so that through the guiding function of the tube it reaches this cassette. It then can be spliced with the fiber coming from the connectors. Likewise the same approach can be taken from the side of the connectors. In one possible configuration it is ensured that for any given position on the connector array the corresponding fiber would be guided into a given cassette into which it then can be spliced to the corresponding incoming fiber. Alternatively a smaller number of guides 38 is used guiding the fibers to the fan-out element 50, which is designed so that the fibers can exit the drawer on the external side. (Not shown in FIG. 1.) Subsequently the pre-selected cassette can be opened allowing to feed the fibers into is manually. All of this is very advantageous because it is continuously necessary to add or replace optical fibers.

Figure 3:
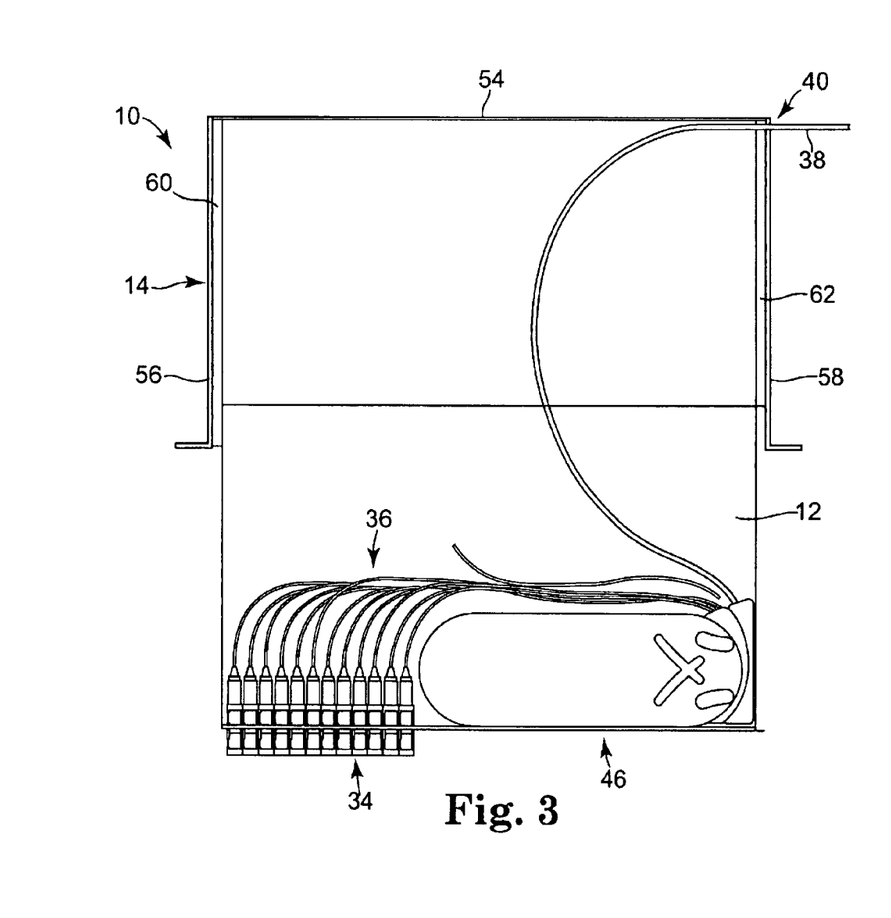
FIG. 3 shows a first embodiment related to the movement of the drawer.

FIG. 3 shows the function of a first embodiment of the drawer, which is in the closed position as shown in FIG. 1, showing housing 14, drawer 12 with the array of fiber optic connectors 34, the array of fiber optic splicing cassettes 46. Also shown is the internal fiber wiring 36 and the incoming tube of optical fibers 38, which reaches housing 14, preferably on the rear side 40. The housing 14 comprises a rear wall 54 and side walls 56, 58. Rails 60, 62 are attached onto the side walls 56, 58 so that the drawer can be moved onto these rails. This is done for each drawer within the system. This means in a configuration according to FIG. 2, there are four pairs of rails to support the drawers 12, 16, 18, 20. The rails 60, 62 are of the standard type, and the drawer 12 moves along those in a well-known manner and is also provided with a blocking mechanism to prevent the drawer from falling off the housing if the drawer is extended too far. There may be also provisions, which allow a user to remove the drawer and reinsert it in a controlled manner, as with conventional drawers. This is useful if there is a need to assemble fibers in drawers that should be completely taken out of the housing 14, to provide additional working space for a user. This removability feature, however, is not mandatory.

Figure 4:
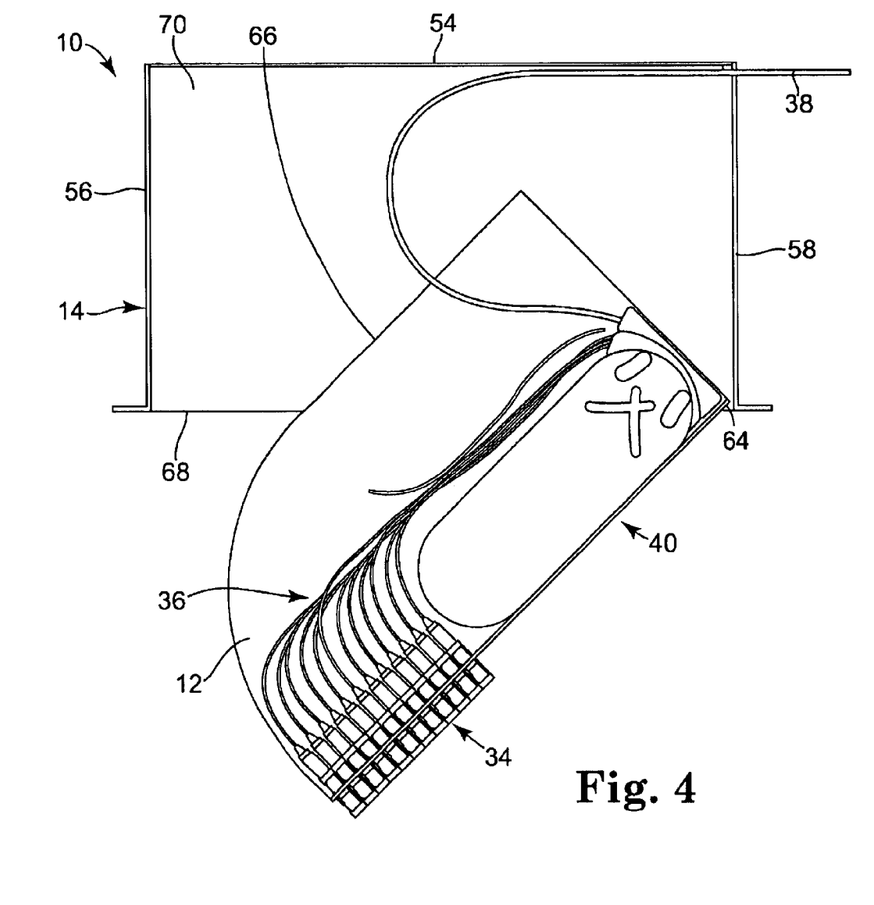
FIG. 4 shows a second embodiment for the movement of the drawer.

FIG. 4 shows another embodiment, in which the drawer 12 is attached to the housing on an axis 64 on the right side of the side wall 58 on the front portion. In this case the rear side of drawer 12 is provided with a rounded corner 66, which is designed to enable the drawer 12 to move in and out of housing 14. Line 68 shows the front line of the housing, which can be either the next drawer or a horizontal separation wall 70 between two adjacent drawers. It depends on the detailed requirements whether such an additional wall is needed or not.

Figure 5:
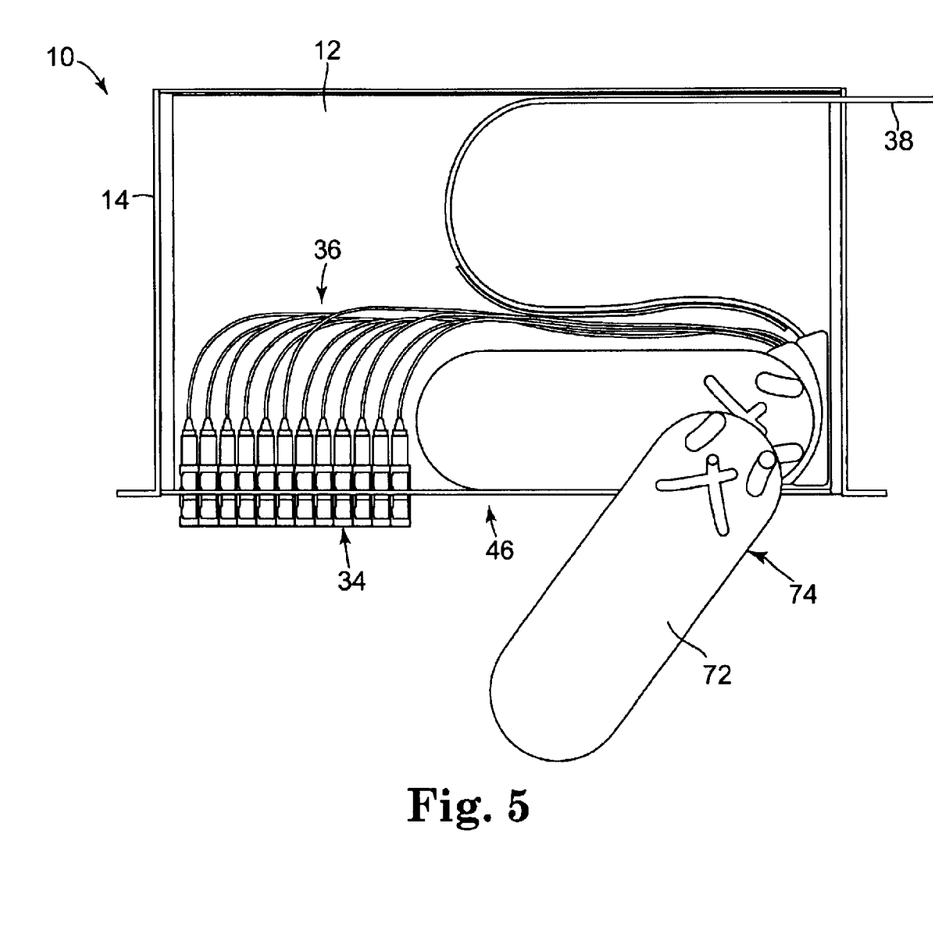
FIG. 5 shows the opening of an individual cassette of the array of cassettes in a drawer without opening the drawer.

FIG. 5 shows in more detail the advantages of the system for accessing an individual fiber optic splicing cassette, without the need to open the respective drawer in which it is placed. It shows the entire system 10 with housing 14 and a top view of drawer 12, in the incoming fiber optic tubes 38 the array of fiber optic connectors 34, the corresponding fiber optic cabling internally from these connectors 36 and especially the array of fiber optic splicing cassettes 46. As shown, one of the splicing cassettes 72 is moved out of the array 46 utilizing a mechanical configuration 74, that not only allows the fiber optic splicing cassette 72 to rotate, but simultaneously to extend it out of the drawer system. However, it should be noted that the principle operates as well with any kind of array of fiber optic splicing cassettes, which in principle allow the movement of a single cassette without disturbing the adjacent ones. For example, configurations as known in the prior art could be used as well where the cassettes are directly rotated around an axis.

Figure 6:
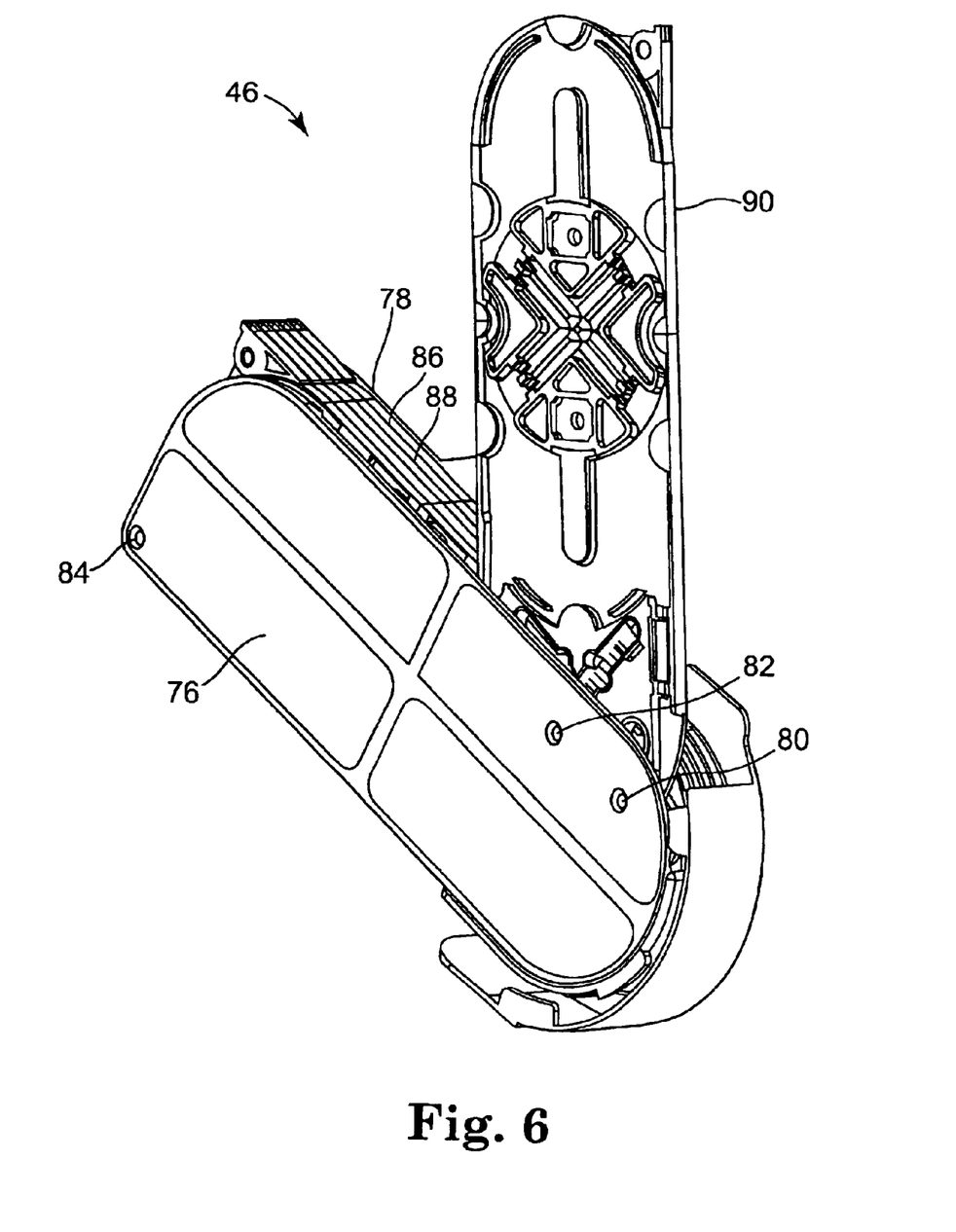
FIG. 6 shows an array of fiber optic splicing cassettes.

Further details regarding one embodiment of the invention are provided in and described in relation to FIGS. 6 through 9. The array 46 of fiber optic splicing cassettes consists of two side plates 76, 78 that are fixedly held together with three axes or rods 80, 82, 84, which will be explained in further details below. Between these side plates 76, 78 six cassettes for the management of the optical fibers are placed, which also will be explained in further detail in conjunction with the description for FIG. 7, only three of them 86, 88, 90 are referred to. In FIG. 6 the cassette 90 next to the side plate 76 is moved out the array while in FIG. 7 the first cassette 86 close to side plate 78 is moved out while the next cassette 88 is left in the system.

Figure 7:
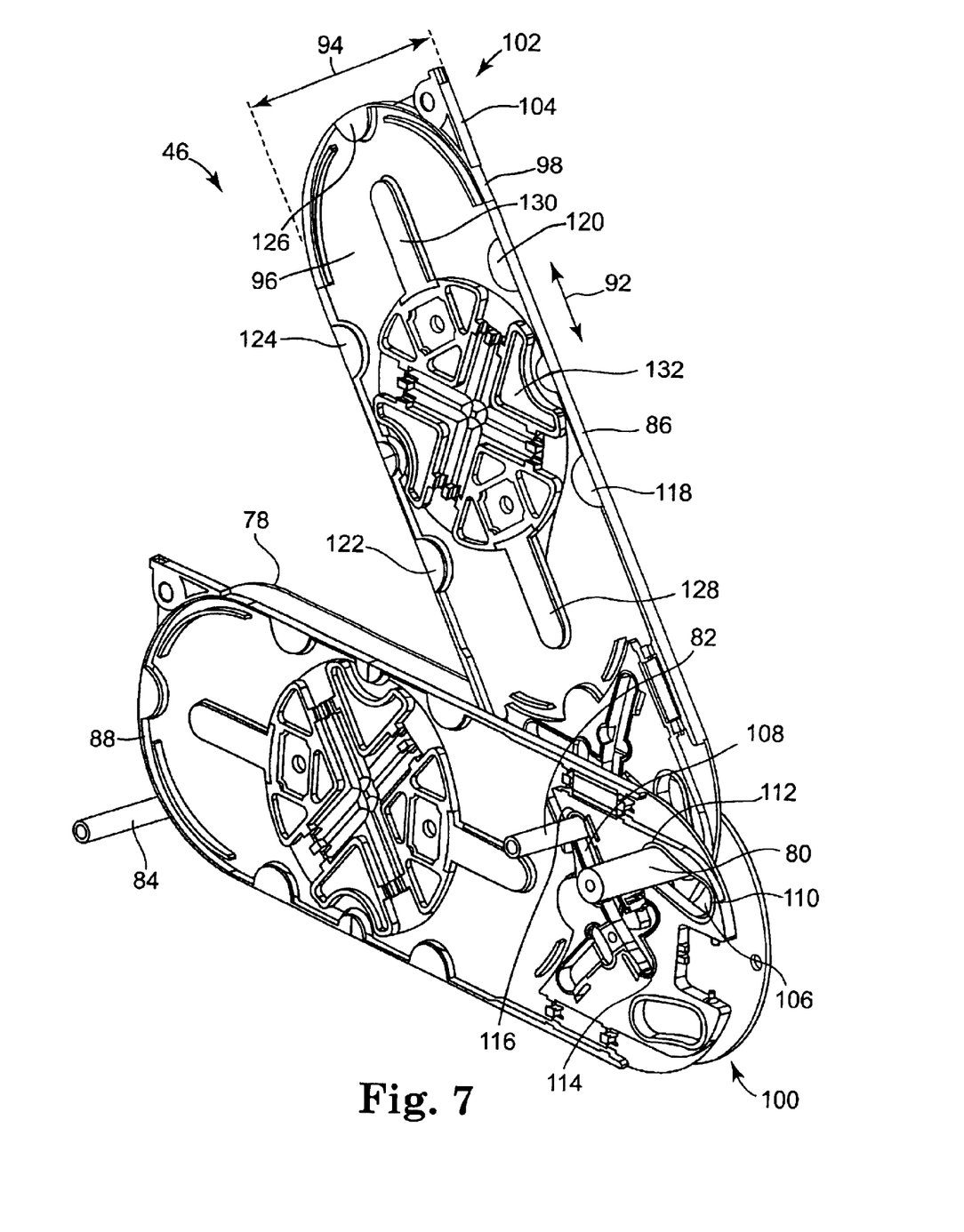
FIG. 7 is a partially taken apart array in accordance with FIG. 6 showing the movement mechanism for moving an individual cassette within the array.

The following describes the characteristics of the individual cassette 86 in FIG. 7 but this is valid for all cassettes within the array. This cassette has a longitudinal extension, which is indicated by the double arrow 92 and a width 94. The longitudinal extension is significantly larger than the width 94. The cassette essentially consists of a base plate 96 and is at its circumference surrounded by an outer wall 98, which only with some interruptions is arranged at the entire circumference. This is a preferred configuration. It is also possible to only have such a wall at portions of the circumference but preferable the entire circumference is provided with this wall to obtain a maximum protection for the optical fibers. The height of wall 98 essentially determines the thickness of the cassette 86. This thickness being significantly smaller than the width 94 and the longitudinal extension 92 of cassette 86. Cassette 86 is placed within the array by the axes 80, 82. This is achieved, so that is possible that cassette 86 like all the other cassettes can be moved out of the array as depicted from the first longitudinal end 100. Cassette 86 can be moved out of the array at the second longitudinal end 102 utilizing a handle like configuration of some kind 104. This is designed, so that it is possible to grasp one of the cassettes that is supposed to be moved out of the array. The handle 104 is preferably provided with means for marking of some kind at least a numbering or the like, so that is possible to identify the cassette that is supposed to be opened.

It can now be understood in which way the array 46 is typically assembled. Side plate 78 is provided with axes 80, 82, 84, which are fixedly mounted onto side plate 78. As a next step the cassettes are placed onto the axes through a first curved slot 106 and a second curved slot 108. The cassettes are moved on to axes 80, 82 through slots 106, 108 sequentially starting with cassette 86, then 88 etc. After having the assembly completed with the last cassette 90, the second side plate 76 is placed on to axes 80, 82, 84 (FIG. 6) and fixedly mounted to it. This can be done in any way through a specially designed snapping mechanism, ultrasonic welding, gluing etc.

FIG. 7 further allows to describe in which way an individual cassette can be moved out of the array. This is achieved through a special design of curved slots 106, 108. When looking at cassette 88 it can be seen that curved slot 106 has a right end 110 and a left end 112. Slot 108 has a right end 114 and a left end 116. In this closed position the axes 80, 82 touch the left ends 112, 116 of curved slots 106, 108. When moving a cassette out as it is shown with cassette 86, the cassette is guided through axes 80, 82 until these axes touch the right ends 110, 114 of curved slots 106, 108. In order to realize this it is necessary to provide a geometrical configuration, which allows an easy movement of the cassette. This is generally known by someone skilled in the art. Such a design, the positioning and the way of curving of slots 106, 108 can either be identified through experiments or which is usually preferable by corresponding numerical calculations utilizing formulae, computer programs or the like, all of these being well-known to someone skilled in the art. The essential feature is that in this way the cassette 86 is not only rotated around an axis, but simultaneously moved out in a direction, which is perpendicular to the longitudinal extension 92 of cassette 86. This allows to access the internal part of the cassette, after the cassette has only been moved at a relatively small angle, which in this design is in the order of 60°. In the configuration shown in FIG. 7 the arrangement is so that the cassette is moved at the first longitudinal end 102, utilizing the handle 104. An alternative approach will be referred to below.

Cassette 86 is can be made by injection molding, and comprises a base plate 96 and a side wall 98 as described above. It furthermore contains molded in configurations 118, 120, 122, 124, 126, which project from the upper side of the wall 98 on the base plate 96 corresponding openings are provided in order to allow a molding of this component without the use of any drawers. These devices provide possibilities to maintain the optical fibers that are guided inside the cassette and to keep them in place. The same applies to the fingers 128, 130 that are provided in the middle and where also in the base plate 96 corresponding openings are left for the same reason. The circular middle portion in the base plate 96 designated with 132 provides means for the fixing of the fiber optic splices.

Figure 8:
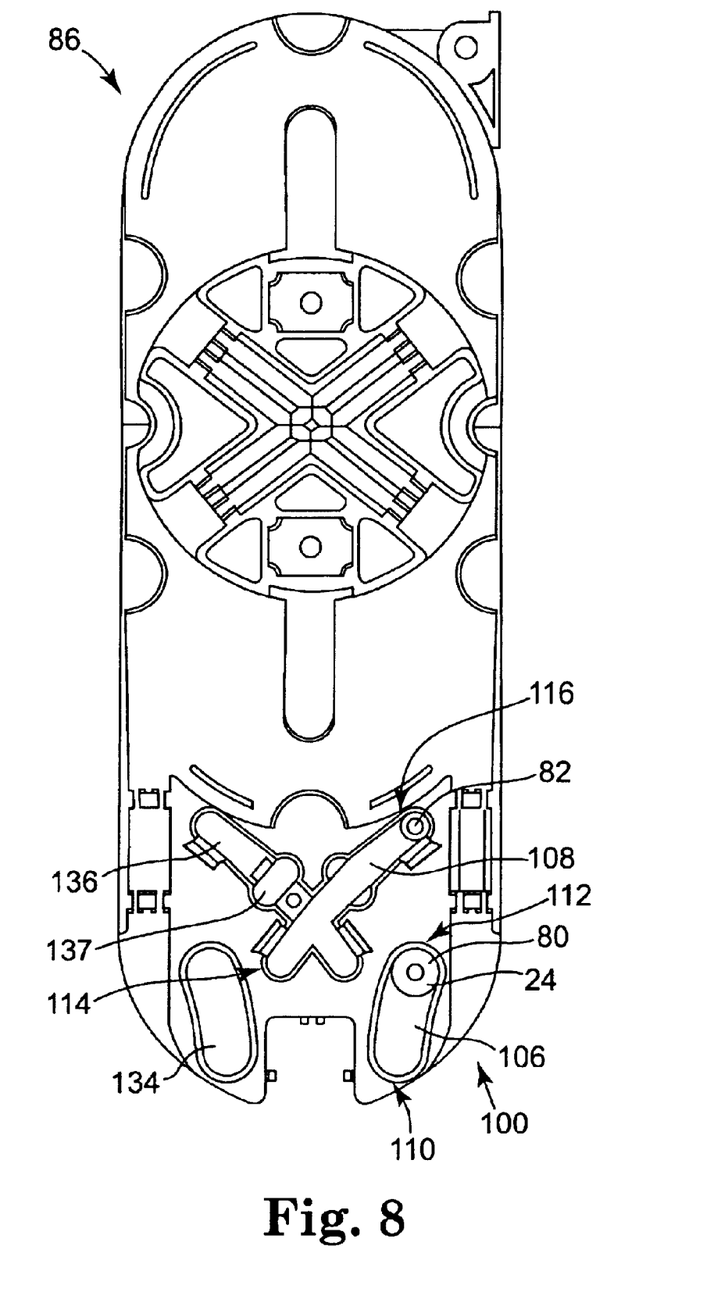
FIG. 8 shows a top view of an individual cassette with an arrangement of two pairs of slots at the first longitudinal end allowing a movement of the cassette to the right side as depicted.
Figure 9:
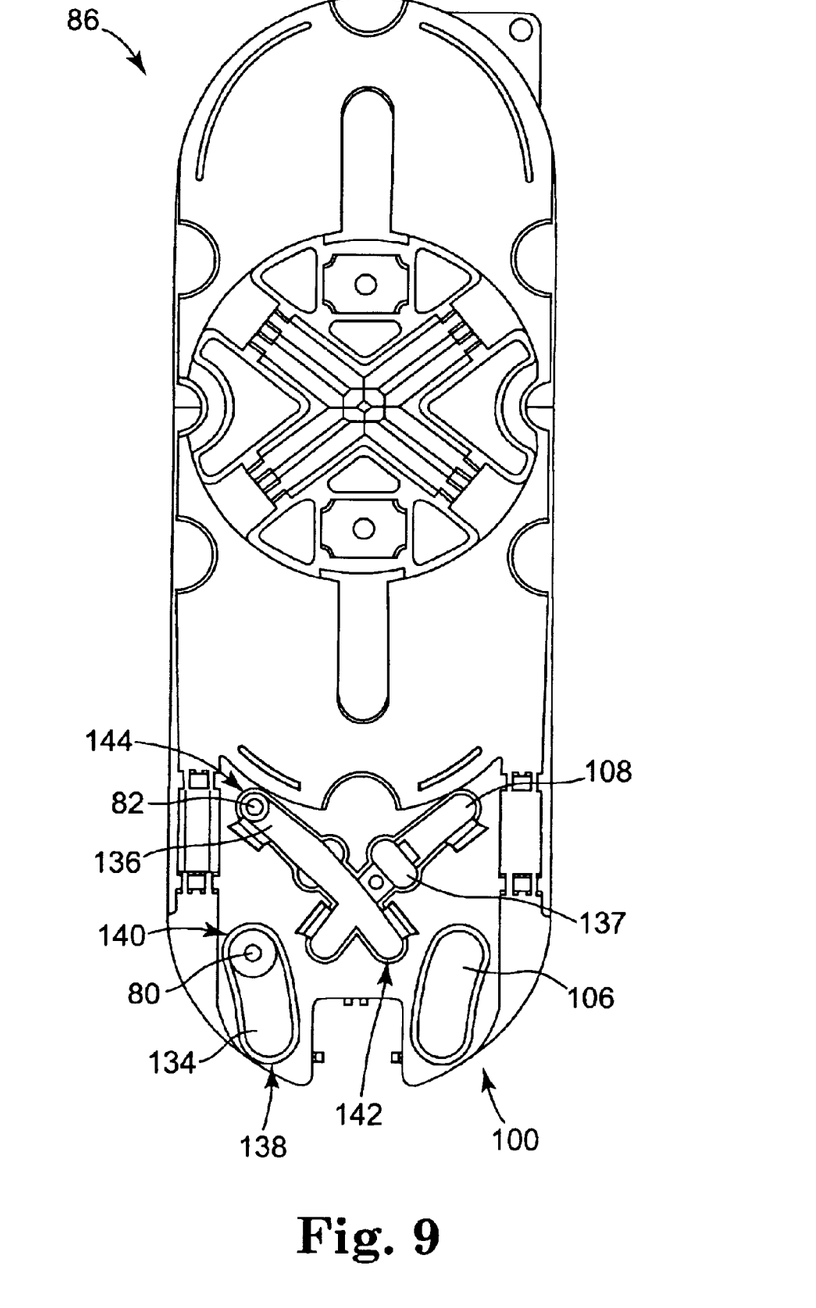
FIG. 9 shows the same cassette, however, arranged for a movement to the left side in the shown arrangement.

FIGS. 8 and 9 explain more in detail the purpose of the use of a first pair of curved slots 106, 108 and a second pair of curved slots 134, 136. The configuration in FIG. 8 essentially shows the positioning of the cassette and the axes 80, 82 that are supposed to hold cassette 86 as in FIG. 7, mainly in a closed position. Axes 80, 82 touch slots 106, 108 at their ends 112, 116 opposite to the first longitudinal end 100. A blocking component 137 is arranged in slot 136. When moving cassette 86 out this movement is guided by axes 80, 82, which then pass through slots 106, 108 until they reach the ends 110, 114 close to the first longitudinal end 100. As described above typically the cassettes when they are opened have to be accessed from the top. It may be desirable to move the cassette out not from the first longitudinal end as shown in FIG. 6 but for whatever reason from the opposite end. In order to avoid the need to mold a second component, the double configuration with the two pairs of slots 106, 108 and 134, 136 allows to use the very same component for this alternative arrangement where for example the cassette is not moved from the right but from the left side or vice versa. This alternative configuration can be seen in FIG. 9. Here the same kind of cassette that is then movable from the other side, is guided again through the axes 80, 82, which however move in slots 134, 136. In the closed position they touch the ends 140, 144 opposite to the first longitudinal end 100 as shown. In the open position the axes move along the slots 134, 136 until they reach the opposite ends 138, 142 close to the first longitudinal end 100 as depicted. The blocking component 137 accordingly is placed into slot 108.

Other aspects of the invention include the following. The invention provides complete access to all functional elements for the initial installation of the optical fibers, and only access to the splice area for re-splicing. This can be done without movement of any adjacent cassette and therefore without disturbing others fibers. There are several ways in which the drawers can be designed to provide the features desired, including by telescoping outward, swiveling, or other mechanisms. All work can be done with access to the front of the array of cassettes, and different sizes and types of cassettes can be used. Substitution of fiber wiring 36 by new pigtails or fixed fibres or later installation of the pigtails can be done from front side without opening the drawer, by using guiding tubes or elements that guide the pigtail fibers from the front entry position via fan out element to the individual splice cassettes. Substitution or later installation of fiber tubes can be done from front side without opening the drawer by using guiding tubes or elements that guide the fiber tubes from rear entry via a second fan out element to the front where they can be distributed to the cassettes.

What is claimed is:

1. A system for management of optical fibers, comprising:
a housing including a back side and a front side;
a plurality of drawers mounted in said housing, wherein said drawers have a front and a back, and wherein said drawers are mounted so as to be moveable between a first position and a second position, wherein when said drawers are in said first position, said housing substantially blocks access to said back of said drawers, and wherein when said drawers are in said second position, there is access to said back of said drawers;

an array of fiber optic connectors mounted on a respective one of each of said drawers;

an array of fiber optic splicing cassettes mounted on a respective one of each of said drawers so as to permit each of said cassettes to extend out of said respective drawer while said drawer is in said first position.

2. The system of claim 1, further comprising a plurality of optical fibers connected with said optical connectors and of sufficient length and arrangement to allow said fibers to extend to said optical fiber splicing cassettes.

3. The system of claim 1, wherein said optical fiber splicing cassettes are moveable between a closed position to an open position extending from said drawer, while said drawer is in either of said first or second positions.

4. The system of claim 1, wherein each of said drawers further comprises a first guide adapted to guide an incoming optical fiber from the back of a respective one of said drawers to a respective one of said array of optical fiber splicing cassettes.

5. The system of claim 4, wherein each drawer further comprises a second guide adapted to guide an optical fiber from a respective on of said array of connectors to a respective one of said array of cassettes.

6. The system of claim 1, wherein said drawers are adapted to be individually moved between said first and second positions.

7. The system of claim 1; further comprising a plurality of rails on which said drawers move between said first and second positions.

8. The system of claim 1, wherein each of said drawers is pivotally mounted to said housing such that each of said drawers may be rotated between said first and second positions.

9. The system of claim 8, wherein said drawers rotate no more than 90 degrees between said first and second positions.

10. The system of claim 3, wherein each of said cassettes rotates between said open and closed positions.

11. The system of claim 10, wherein said cassette rotates no more than 90 degrees between said open and closed positions.

12. The system of claim 10, wherein said cassettes are rotated so that they simultaneously are also linearly moved away from a respective one of said drawers.

13. The system of claim 1, further comprising a plurality of guides extending from said housing to a respective one of said cassettes.

* * * * *